United States Patent [19]

Molstad

[11] Patent Number: 4,916,889
[45] Date of Patent: Apr. 17, 1990

[54] EASILY ADJUSTABLE TOWED MOWER

[75] Inventor: Roger D. Molstad, Sioux Falls, S. Dak.

[73] Assignee: K-W Manufacturing Co., Inc., Sioux Falls, S. Dak.

[21] Appl. No.: 318,617

[22] Filed: Mar. 3, 1989

[51] Int. Cl.$^4$ ................. A01D 34/66; A01D 75/14
[52] U.S. Cl. ........................... 56/14.9; 56/6; 56/15.5; 56/15.6; 56/320.1
[58] Field of Search .............. 56/14.9, 15.1, 15.2, 56/15.6, 218, 228, 320.1, 320.2, 15.4, 15.5, 6; 280/467; 172/250, 254, 447

[56] References Cited

U.S. PATENT DOCUMENTS

| | | | |
|---|---|---|---|
| 2,928,223 | 3/1960 | Danuser | 56/14.9 X |
| 3,157,014 | 11/1964 | Bottenberg | 56/320.2 X |
| 3,208,207 | 9/1965 | Bottenberg | 56/14.9 X |
| 3,601,958 | 8/1971 | Roof | 56/14.9 X |
| 3,757,500 | 9/1973 | Averitt | 56/14.9 X |
| 4,518,046 | 5/1985 | Rettig et al. | 172/447 X |

*Primary Examiner*—Hoang C. Dang

*Attorney, Agent, or Firm*—James T. FitzGibbon

[57] ABSTRACT

A towed mower having a rectangular frame and a pair of diagonally related blade spindles is described. The mower of the present invention includes both a wide side and a narrow side and an associated shroud assembly. A pair of blade spindles each carry a rotary mower blade covered by the shroud assembly. The mower may be used in either a wide mode or a narrow mode and the preferred embodiment provides an arrangement of parts for easy retorientation between the wide and narrow modes. Separate outlet doors are provided for both the wide side and the narrow side on the shroud assembly and hitch-engaging posts are disposed at each corner of the mower frame to engage a pair of wheel suspension arms and a pair of hitch-engaging brackets. The hitch-engaging brackets and the wheel suspension arms are secured to the posts in a manner which allows ready removal and/or pivoting of the suspension arm or the hitch-engaging bracket so that the mower may be re-oriented from the wide mode to the narrow mode and vice versa.

11 Claims, 3 Drawing Sheets

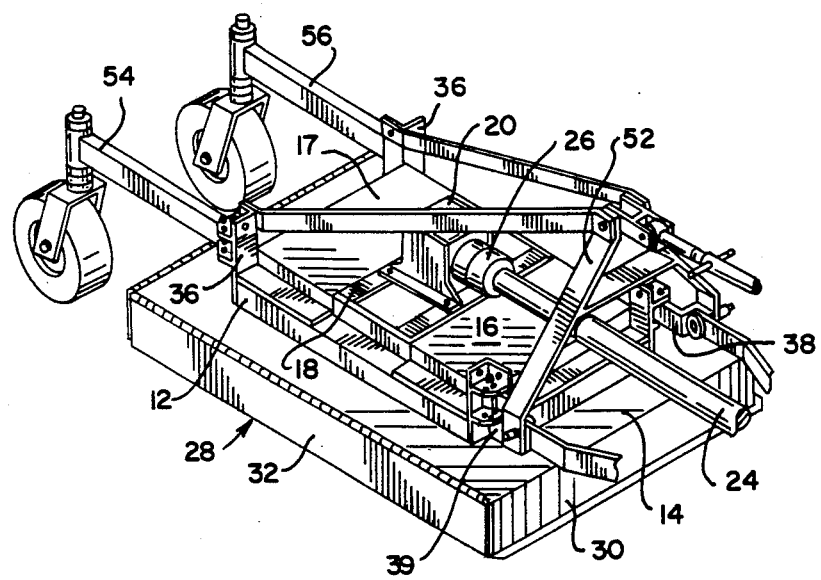
FIG-3-
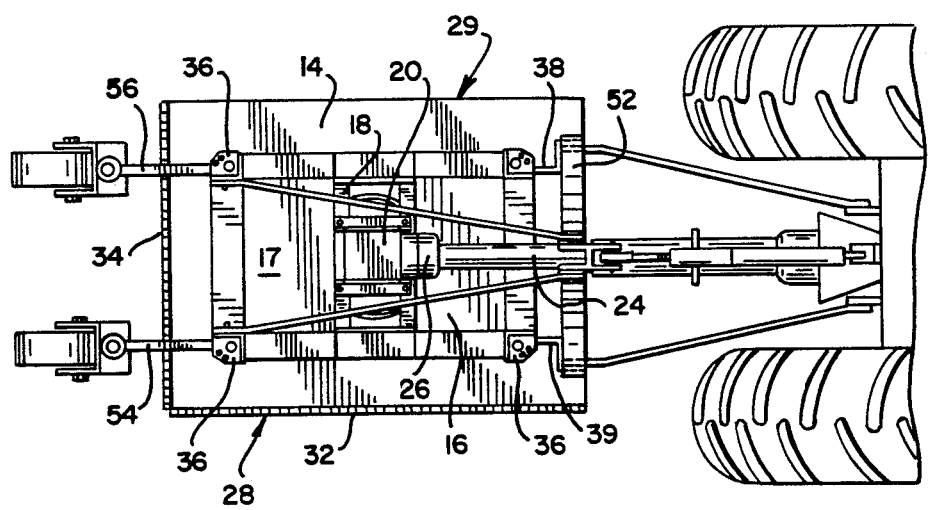
FIG-4-

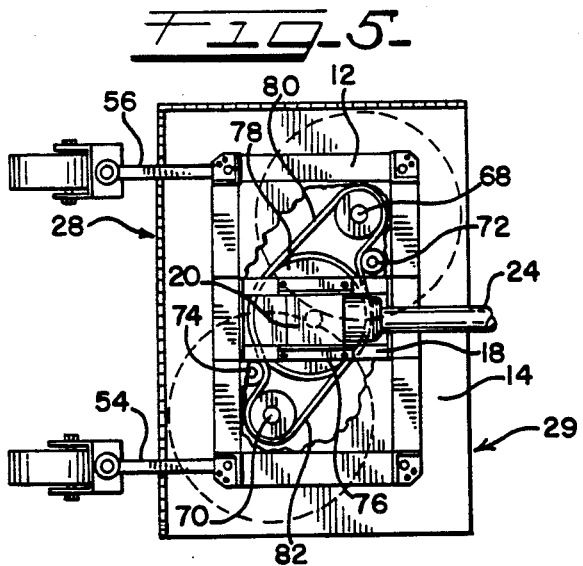
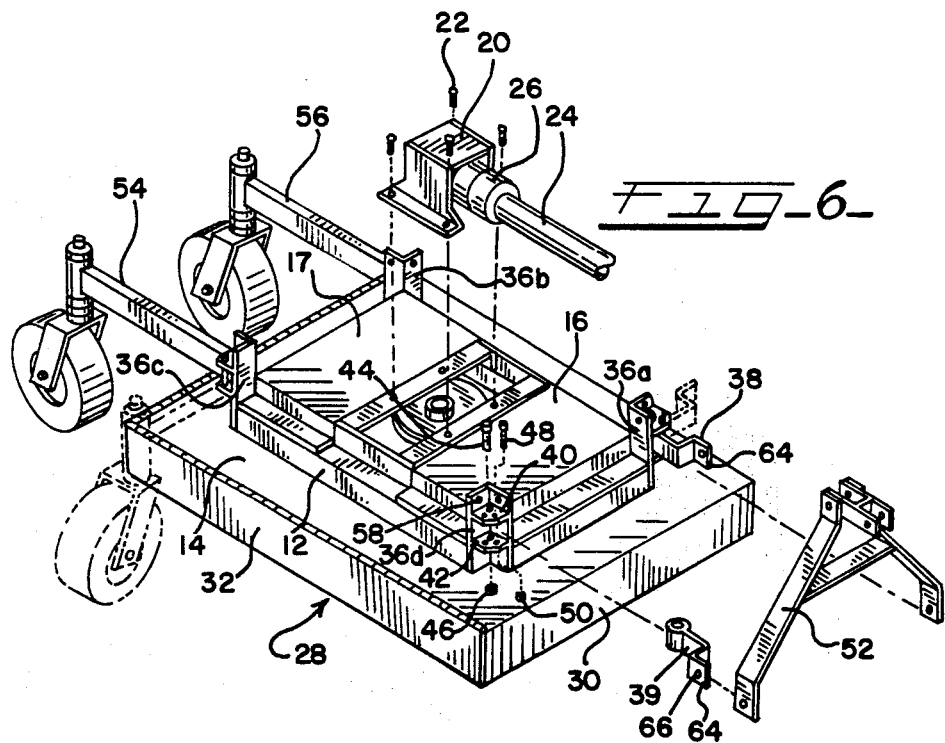

EASILY ADJUSTABLE TOWED MOWER

The present invention relates generally to agricultural machinery and more particularly, to a multi-blade mower unit adapted to be towed by a vehicle such as a tractor or the like. According to the invention, a dual blade rotary mower unit is provided which has a wide side and a narrow side, and includes a novel suspension arrangement which permits the mower to be towed in such a way as to cut a mower swath of a greater width when towed from the wide side of the mower unit and a swath of reduced width when towed from the narrow side of the mower unit.

Those engaged in various fields of agriculture, such as owners of tree farms and orchards and the like have need of rotary mowers. In the manufacture of rotary mowers for towing with a tractor or the like, it is usually desirable to secure a favorable balance of cost reduction and efficiency by providing a mower which will cut a reasonably wide swath, while keeping in mind the towing capacity and power available for this purpose. Such considerations normally dictate providing a mower having a single power take off and a pair of blades in laterally spaced relation and, wherein, the mower is arranged and adapted to be towed only in a single direction. However, if it is necessary or desirable to mow a narrower swath, such as between rows of trees or other crops, then the above-discussed considerations relating to the purchase of a wider mower are no longer applicable. Previously, it is has been difficult for those engaged in agriculture to obtain a versatile mower which is capable, in one application to mow a relatively narrow swath and at other times, to mow a wider swath.

Ideally, a single mower would be capable of cutting both wide and narrow swaths. But, as far as is presently known, any attempts to provide mowers of this sort have either involved a relatively great deal of complexity or have simply not being able to utilize the capacity of an extra blade positioned in the mower.

The present invention overcomes these problems by providing a mower having a rectangular frame and a pair of diagonally related blade spindles, each carrying a rotary mower blade. The mower of the present invention includes both a wide side and a narrow side with shroud assembly for the blades and a separate outlet door for both a wide mode as well as a narrow mode. Hitch-engaging posts are disposed at each corner of the mower frame with a pair of wheel suspension arms and a pair of hitch-engaging brackets, each secured to an associated suspension mounting post by a pin-and-eye arrangement which permits ready removal and/or pivoting of the associated suspension component into a position whereby the mower may be towed from either the wide or the narrow side.

In a preferred form, the hitch-engaging brackets are made to be reversible so that the track or width of the hitch frame may be easily accommodated by the distance between a pair of brackets in either the wide or the narrow mower position. When it is desired to change the mower orientation from the wide mode to the narrow mode, for example, one wheel suspension arm is simply pivoted and then locked into its proper orientation about its mounting post. The other wheel suspension arm is moved to the opposite diagonal corner and is also locked in its proper orientation about the mounting post. One of the hitch-engaging brackets may be pivoted and locked, in the same manner as described with respect to the wheel suspension arm, and the other hitch-engaging bracket may be removed and repositioned in a diagonally opposed suspension mounting post in such a manner reversed to provide a substantially constant based measure between the pair of hitch-engaging elements. The power take off angle drive is mounted for pivotal movement, and is swung through a 90° arc for repositioning.

In view of the need for a low cost dual width towed mower which can be converted for towing from either the wide or narrow side, it is an object of the invention to provide an improved mower unit.

Another object of the invention is to provide a mower unit having wide and narrow sides, a rectangular frame and an arrangement of suspension mounting posts, wheel suspension arms and hitch-engaging brackets permitting ready removal and repositioning of these parts to facilitate rearrangement of the towing direction with minimal effort.

Another object of the invention is to provide a mower which may be readily rearranged to be towed from the wide or narrow side and which includes a power take off angle drive with a coupler and a readily repositionable angle drive unit.

Another object of the invention is to provide a mower having a towing arrangement which includes a pair of reversible hitch-engaging brackets facilitating movement from a wide to a narrow side of the mower, while maintaining a constant distance between their hitch-engaging ends.

Another object of the invention is to provide a towed mower suspension arrangement which includes suspension mounting posts arranged in the form of brackets made from angle stock and having horizontally disposed upper and lower, pivot pin mounting plates permitting ready adjustment and/or removal of the associated suspension parts.

Another object of the invention is to provide a mower unit having a rectangular frame, a pair of blades carried therein in angular offset relation to define respectively wide and narrow swaths between their outer extremities, and a shroud arrangement having at least one outlet door on each of adjacent wide and narrow sides.

Another object of the invention is to provide an adjustable mower unit which is simple and reliable to operate in use and which no additional components need to be used in order to change between narrow and wide mowing swaths.

The foregoing and other objects and advantages of the invention are achieved in practice by providing a mower assembly adapted to be towed by a vehicle having a multi-point hitch unit with the mower including a rectangular frame, a pair of angularly related offset mower blades enclosed at least in part by a shroud and having suspension mounting posts at each of the frame corners, a pair of wheel suspension arms and a pair of hitch engaging brackets secured by a mounting pin arrangement for pivotally positioning and for readily moving or repositioning the brackets and suspension arms.

The manner in which the foregoing and other objects and advantages of the invention are achieved in practice will become more clearly apparent when reference is made to the following detailed description of the preferred embodiment of the invention set forth by way of example and shown in the accompanying drawings, wherein like reference numbers indicate corresponding parts throughout.

FIG. 3 is a perspective view of the mower of FIG. 1 and 2, showing the mower rearranged so as to be towed from the narrow side;

FIG. 4 is a top plan view of the mower in the orientation of FIG. 3;

FIG. 5 is a top view with portions broken away, showing the mounting arrangement for the power take off drive, the blade spindels, the frame, and other elements of the mower unit;

FIG. 6 is a perspective view, partially exploded, of the present invention showing the hitch-engaging brackets and the wheel suspension arms used with the mounting posts of the invention and showing the pivotal movement of one of the wheel suspension arms and one of the hitch-engaging brackets moving between the narrow and the wide position.

DESCRIPTION OF THE PREFERRED EMBODIMENTS OF THE INVENTION

While the invention is capable of being embodied in different forms, a description will be given of a form wherein a pair of mower blades are provided, wherein the power source is a power take off unit and wherein the suspension units include a pair of hitch receiving brackets and a pair of wheel suspension arms, it being understood that the vehicle might be towed by another arrangement so as to require more than two wheel suspension arms, for example. The illustrated form of towing arrangement is a three point hitch with an A-frame unit of a type well known to those familiar with agricultural equipment. The power take off is illustrated as a preferred form of securing power for the blade drive but an on-board motor may be provided or another power source might by used if indicated and still provide a device falling within the spirit of the invention.

Figure 1:
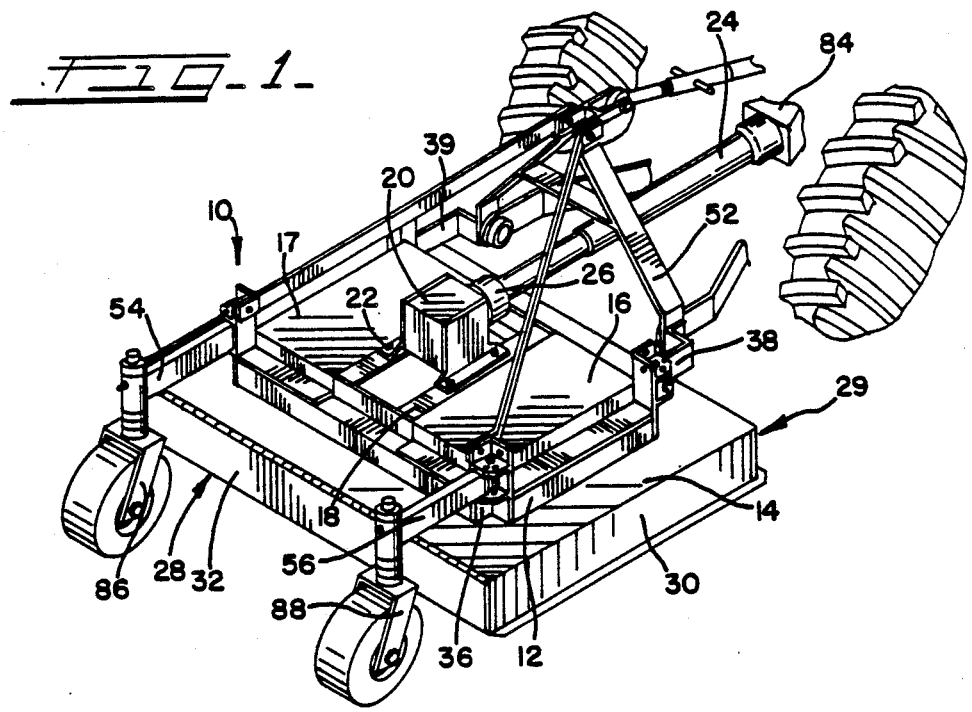
FIG. 1 is a perspective view, with portions broken away, showing a mower unit made according to the invention and being towed by a tractor having a three point hitch and a power take off assembly, the mower being towed from the wide side so as to cut a relatively wide swath.

Referring now to the drawings in greater detail FIG. 1 shows a mower assembly generally designated 10 and made in accordance with the invention. The mower assembly 10 is shown to include a rectangular frame 12 to which is attached a shroud assembly 14 which provides cover for a pair of rotary mower blades (not shown). A pair of cover assembly members 16 and 17 are provided and are dimensioned to rest upon the frame 12 to cover the drive assembly of spindles and pulleys which are used to drive the two rotary blades. The two cover assembly members rest upon the frame 12 and each member abuts against one of the angle drive support braces, generally designated as 18. An angle drive 20 is reversibly secured to the pair of angle drive support braces 18 by a plurality of mounting bolts 22 to thereby secure the angle drive 20 to the mower assembly. The angle drive 20 is preferably centrally mounted within the frame 12 on the two support braces 18 to supply power to the rotary blades of the mower 10 via the mower drive shaft 24 which is coupled to the angle drive 20 through coupler 26. In the depicted embodiment, a power take-off (PTO) assembly is provided and is represented by the PTO attachment unit 84 for positioning the mower 10 in an operative and in an inoperative position, as known to those in the art. As mentioned, an on-board motor or other power source may be used in lieu of the angle drive 20 if desired or necessary.

Figure 2:
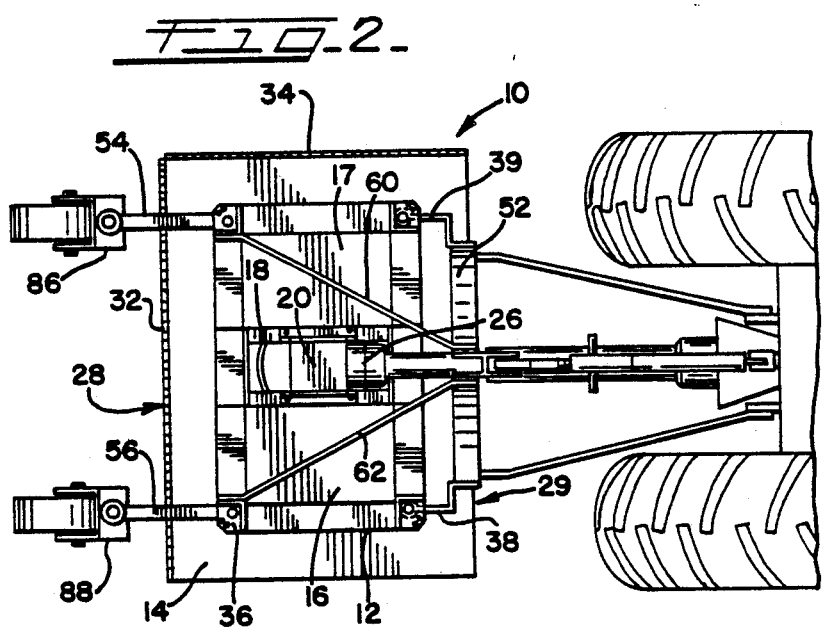
FIG. 2 is a top plan view of the mower arrangement of FIG. 1.

In accordance with the present invention, and as is further discussed herein, the mower 10 may be used in two orientations, as illustrated by the distinctions between FIGS. 1 and 2 and FIGS. 3 and 4. As shown in FIGS. 1 and 2, the mower 10 may be used in a wide orientation or mode. In distinguishing between the two orientations, it is convenient to refer to the long sides 28 and 29 as the wide sides of the mower assembly 10. Likewise, a narrow orientation is achieved by reorientation of the mower assembly 10, as described herein, so that the narrow vertical plane defined by the side 30, lies in a substantially perpendicular relationship to the mower drive shaft 24, as is shown in FIGS. 3 and 4. Two outlet doors in the form of a wide outlet door 32 and a narrow outlet door 34 are provided along adjacent sides of the shroud assembly 14. The outlet doors 32 and 34 are of a conventional construction and are preferably hingedly attached to the shroud assembly 14. Each outlet door is provided with standard means for maintaining the door in an opened position to provide an outlet for clippings and the like. The novel suspension arrangement of the present invention permits the mower assembly 10 to be towed in such a way as to cut either a mower swath of a greater width when towed from the wide side 29 or a swath of reduced width when towed from the narrow side 30. When towed from wide side 29, wide outlet door 32 may be utilized. Likewise, when towed from narrow side 30, outlet door 34 provides the means for clippings to escape from beneath the shroud assembly.

In a preferred form, suspension mounting posts 36 are disposed at each corner of the frame 12. The suspension mounting posts 36 are affixed to the frame 12, preferably by welding to provide the structural integrity needed for towing the mower assembly 10 behind a vehicle such as a tractor or the like. As is most clearly shown in FIG. 6, two hitch-engaging brackets 38, 39 are slidably received within two of the suspension mounting posts 36a and 36d between an upper horizontal surface 40 and a lower horizontal surface 42 thereof. Each of the hitch-engaging brackets 38, 39 are pivotally secured within the mounting posts 36 by a pivot pin 44 and its associated nut 46. Stop means are provided in the form of a locking pin 48 and nut 50 to secure each bracket 38, 39 in a preferred orientation, either for wide mode and narrow mode use of the mower assembly 10. Pivot pin 44 and locking pin 48 are positioned within the suspension mounting posts through axially aligned eyes provided in the upper and lower surfaces 40, 42 in each of the posts 36. The suspension mounting posts 36 are preferably made from an angle stock to provide an outlet for clippings and the like.

The hitch-engaging brackets 38, 39 are dimensioned to serve a hitch-engaging purpose for engaging the members of a conventional multi-point hitch such as a three-point hitch with an A-frame unit 52.

Likewise, a pair of wheel suspension arms 54, 56 are pivotally positioned within two of the mounting posts 36 in a manner substantially identical to that described with respect to the mounting brackets 38, 39.

Preferably, the suspension mounting posts 36 are provided with an L-shaped collar portion 58 to provide an attachment point for hitch arms 60, 62 extending down from the top most portion of the A-frame unit 52. The hitch arms 60, 62 are secured to the collar 58 with a pin-eye attachment.

In accordance with the principals of the invention, the mower assembly 10 may be oriented in either a wide mode or a narrow mode, depending on the desired application. For example, when it is desired to cut a reasonably wide swath, the wide mode will be selected, substantially as shown in FIGS. 1 and 2. In this arrangement, the outlet door 32 located on the wide side 28 of the shroud assembly 14 will be situated at the rearmost location of the mower assembly 10. While the other wide side 29, opposite the outlet door 32, is positioned in a perpendicular relation to the mower drive shaft 24. Wheel suspension arms 54 and 56, with their associated wheel assemblies 86 and 88, extend behind the mower assembly 10 with the arms 54, 56 in a perpendicular relationship with the vertical surface of the outlet door 32. In this arrangement, the "front" end of the mower 10 is supported in a mowing position by the various attachments between the tractor or other towing vehicle and the mower 10. As can be seen in FIG. 1, the hitch member 52 is positioned secured to and between the hitch-engaging brackets 38, 39. As is shown in each of the figures of the preferred embodiment, the hitch-engaging are generally dimensioned to extend outwardly from the frame 12 with two 90° angles provided on each of the brackets 38, 39. When the mower assembly 10 is positioned in the wide mode, the hitch 52 will preferably fit completely between the two brackets 38, 39.

Depending on the application, it may be desirable to tow the mower 10 in such a way as to cut a swath of reduced width such as when cutting between rows of trees and the like. For such mowing applications, it will be desirable to tow the mower in its narrow mode. A mower made in accordance with the principals of the present invention will provide means by which the mower assembly 10 may be converted from the wide mode, discussed herein with reference to FIGS. 1 and 2, to the narrow mode such as that depicted and described with respect to FIGS. 3 and 4 herein. In changing between the wide mode and the narrow mode, or vice versa, it is necessary to detach the mower assembly 10 from the hitch arms 60, 62 as well as from the hitch member 52 so that various adjustments may be made to reorient the mower with respect to the angle drive 20 and the drive shaft 24. These adjustments can be made in a relatively simple operation whereby one of the hitch-engaging brackets brackets, such as mounting bracket 38, is pivoted to extend vertically over the narrow side 30 of the mower assembly 10 while the other 39 is removed from its suspension mounting post and repositioned within a diagonally opposite suspension mounting post on the frame 12.

Likewise, one of the wheel suspension arms, such as arm 54, is reoriented through pivotal rotation thereof to reposition the arm 54 to extend vertically outwardly over the outlet door 34 on a narrow side of the shroud assembly 14. The other wheel suspension arm 56 is disconnected from its suspension mounting post 36 and repositioned in a diagonally opposed mounting post to achieve a parallel relationship between the two wheel suspension arms 54, 56.

Referring now to FIGS. 3, 4, and 6, illustration is made of a mower assembly 10 configured in a narrow orientation and in accordance with the principals of the present invention. FIG. 6 is illustrative of the manner in which the various parts of the mower assembly 10 can be reoriented to reconfigure the assembly between a wide orientation and a narrow orientation. With the various pieces of the hitching means detached from the assembly 10, the hitch-engaging brackets 38 and 39, the wheel suspension arms 54 and 56, and the angle drive 20 are all reoriented to allow for use of the mowing assembly 10 in a narrow mode.

As shown most clearly in FIG. 6, the hitch-engaging bracket 38 may be pivoted along the axis of the pivot pin 44 by removal of the locking pin 48 from the suspension mounting post 36a to allow for positioning of the bracket 38 to extend over the narrow side 30 of the shroud assembly 14. When the bracket 38 is properly positioned, the locking pin 48 may be reinserted into axially oriented eyes provided in upper surface 40 and lower surface 42.

The other hitch-engaging bracket 39, however, must be disconnected from its suspension mounting post and reconnected to the diagonally opposite suspension mounting post for reconfiguration into the narrow mode. In the embodiment shown in FIGS. 6, for example, the bracket 39, would have to moved from the suspension mounting post 36b and repositioned within suspension mounting post 36d followed by reinsertion of the appropriate pivot pin 44 and locking pin 48 within the appropriate and axially aligned eyes provided in the upper surface 40 and lower surface 42 of the suspension mounting post 36d.

In this manner, the two hitch-engaging brackets 38, 39 will be oriented substantially parallel to each other and extending outwardly toward the vertical plane defined by narrow surface 30. In the preferred embodiment, the hitch-engaging brackets 38, 39 are dimensioned to include two 90° angled turns, defining three vertical portions and terminating along an edge of one of the vertical portions 64 having an eye 66 extending therethrough. In the narrow mode of the mower assembly 10, the portions 64 of the brackets are oriented parallel to each other and in a manner so that the portions 64 are positioned at a maximal distance from each other. In the described configuration of the brackets 38, 39, the positioning of the portions 64 provides for the proper orientation for attachment to a conventional three point hitch so that the same hitch can be used for both narrow mode and wide mode uses. Likewise, when the mower assembly 10 is configured in a wide mode, vertical portions 64 are oriented to be at a minimal distance from each other for accommodating the distance between the lowermost attachment portions of the hitch member 52.

Regarding the reorientation of the wheel suspension arms 54, 56, positioning between wide and narrow modes is accomplished in substantially the same manner as with the hitch-engaging brackets 38, 39. The wheel suspension arm 54 is pivotally reoriented by rotation about the axis of its pivot pin 44 within the suspension mounting post 36c by first removing locking pin 48 and simply rotating the suspension arm 54 through a 90° arc so that it extends vertically outwardly from the frame 12 and establishes a substantially perpendicular orientation with the plane of the narrow outlet door 34. Reinsertion of the locking pin 48 within axially aligned eyes in the upper surface 40 and lower surface 42 of suspension mounting post 36c will lock the suspension arm 54 into its preferred position for narrow mode use.

Repositioning of the second suspension arm 56 is accomplished in substantially the same fashion as is the above described repositioning of mounting bracket 39.

The suspension arm 56 is removed from the suspension mounting post 36d by removal of a pivot pin 44 and a locking pin 48 therefrom. Once removed, the suspension arm 56 is simply reinserted into the diagonally opposite suspension mounting post 36b so that the two suspension arms 54, 56 are oriented in a substantially parallel relationship to each other. Once properly positioned within the mounting post 36b, reinsertion of a pivot pin 44 and a locking pin 48 into axially aligned eyes provided in upper surface 40 and lower surface 42 of suspension mounting post 36b, will secure the suspension arm 56 in its preferred orientation for narrow mode use.

As already mentioned, the angle drive 20 must likewise be repositioned in switching from one mode to another such as from wide mode to narrow mode, for example. Repositioning of the angle drive is accomplished by removing the mounting bolts 22 from the angle drive support braces 18 so that the housing of the angle drive 20 is no longer affixed to the mower assembly 10. Following removal of the bolts 22, the drive unit 20 and its associated coupler 26 and mower drive shaft 24 are repositioned by rotation thereof, or by rotation of the mower assembly 10 thereunder, through a 90° arc to reorient the angle drive so that mower drive shaft 24 forms a substantially perpendicular relationship with the vertical plane of narrow side 30. Once properly positioned, the bolt receiving holes of the angle drive 20 and the angle drive support braces 18 may be realigned and the angle drive unit 20 reaffixed to the mower assembly 10 by reinsertion of the mounting bolts 22 within the threaded holes of the angle drive support braces 18.

Once repositioning of the angle drive 20, the mounting brackets 38, 39, and the wheel suspension arms 54, 56 is accomplished, the hitch means may be reattached to the mower assembly 10. In this manner, the mower assembly 10 may be used for mowing narrow swaths as may be desired depending upon the particular application.

As is known and as shown in the several embodiments depicted in the figures, the outlet doors 32, 34 are preferably positioned at the rearmost portion of the shroud assembly 14, depending upon whether the device 10 is oriented in a narrow or wide mode. In this manner, clippings and the like are allowed to fall behind the mower assembly 10 as it advances when towed behind a tractor or the like.

With reference to FIG. 5, the cover members 16 and 17 are partially broken away to show the basic orientation of the mower blade sprockets 68, 70 and the associated drive means associated with each mower blade. The mowing diameters for each of the mower blades are shown in phantom. Flywheels 72, 74 are provided and are positioned next to the sprockets 68, 70, respectively. A pair of power drive wheels 76, 78 are positioned beneath the angle drive 20 to provide power to each of the mower blades. The power drive wheels 76, 78 are positioned beneath the angle drive 20 in a stacked relationship with respect to each other. In this orientation, both power drive wheels are simultaneously driven by the angle drive in a conventional manner. A pair of belt members 80, 82 are reaved around the power drive wheels 76, 78, the mower blade sprockets 68, 70 and flywheels 72, 74 substantially as shown, to supply rotational power to each of the mower blades from the angle drive 20, in a manner which is known to those skilled in the art.

It will be understood to those skilled in the art that the present invention is not limited to the particular structures described in association with the preferred embodiment. For example, the exact structures shown and described with regard to the suspension mounting posts 36, the wheel suspension arms 54, 56, the mounting brackets 38, 39 are meant to be illustrative of a preferred embodiment which allows a mower assembly 10 to be easily reconfigured between a narrow cutting mode and a wide cutting mode. Other arrangements of these parts and other relationships therebetween within the mower assembly 10 are contemplated in order to provide the mower assembly 10 alternatively in a wide cutting mode or a narrow cutting mode.

Regarding materials, the variously described parts of the assembly 10 are preferably metallic to provide a structure which is durable and strong.

While a preferred embodiment of the preset invention has been discussed and described herein, it will be understood by those skilled in the art that various other structures are contemplated without departing from the true spirit and scope of the invention as defined in the following claims.

I claim:

1. A mower assembly adapted to be towed by a vehicle having a multi-point hitch and a power take off, said mower assembly comprising, in combination, a rectangular frame, means for mounting a power take off angle drive generally centrally of said frame, a drive input shaft associated with said angle drive, a main blade drive element and a pair of driven elements affixed to spindle units mounted with respect to said mower frame and carrying blades thereon, with said spindles being positioned generally in opposed corners of said frame unit, said angle drive being mounted with respect to said frame so as to permit repositioning of said drive to permit said drive input shaft to be movable between a first and a second position, said mower assembly having a suspension system including a suspension mounting post at each corner of said rectangular frame unit, each of said mounting posts including a mounting pin for pivotally positioning suspension components in operative association with said mounting posts, said suspension components including a pair of wheel suspension arms, each said suspension arm including a wheel support assembly extending downwardly therefrom and a pair of hitch engaging brackets, each of said suspension arms and said hitch engaging brackets including means cooperating with said mounting pins, said brackets and said suspension arms being constructed and arranged for interchangeable pivotal fit with each of said suspension mounting posts, and said mower blades being enclosed by a shroud, said shroud dimensioned to have a long side and a short side such that said mower assembly has a narrow orientation and a wide orientation, one of said suspension arms being pivotally mounted for movement so as to lie rearwardly of either said long side or said short side and the other wheel suspension arm being movable between mounting posts to likewise position said other wheel suspension arm rearwardly of said long side or said short side, both said suspension arms being positioned adjacent a long side door or a short side door provided in said long side and said short side, respectively, with said hitch-engaging brackets being movably positionable between said mounting posts whereby both of said brackets may extend toward a position for engaging portions of a hitch frame, said mower assembly further including means for attaching portions of said hitch-engaging brackets and for attaching portions of said mounting posts to said hitch frame.

2. The mower assembly as defined in claim 1 wherein said first position of said drive input shaft positions said drive input shaft in a substantially perpendicular orientation with respect to said long side.

3. The mower assembly as defined in claim 1 wherein said second position of said drive input shaft positions said drive input shaft in a substantially perpendicular orientation with respect to said short side.

4. The mower assembly as defined in claim 1 wherein said suspension mounting posts are welded to said rectangular frame at each corner of said frame.

5. A mower assembly as defined in claim 4 wherein said suspension mounting posts include an upper horizontal surface and a lower horizontal surface for receiving said suspension components therebetween, each said suspension component being retained within a suspension mounting post by a pivot pin extending through said upper horizontal surface, through said suspension component, and through said lower horizontal surface, said suspension component being pivotable along the axis of said pivot pin while retained within said suspension mounting post.

6. The mower assembly as defined in claim 1 wherein said shroud provides both a narrow and a wide orientation for said mower assembly, adjacent sides of said shroud being provided with a long side door and a short side door affixed thereto, said long side door and said short side door being provided for use when said mower assembly is in said wide orientation and said narrow orientation, respectively.

7. The mower assembly of claim 6 wherein said long side door and said short side door are hingedly affixed to said shroud.

8. The mower assembly of claim 1 wherein said mower assembly is constructed to permit reorientation thereof between said narrow and said wide orientations by pivoting one of said hitch-engaging brackets and one of said wheel suspension arms within the suspension mounting post associated therewith, said other wheel suspension arm and a second hitch-engaging bracket being repositioned within a diagonally opposed suspension mounting post along said rectangular frame.

9. The mower assembly as defined in claim 1 wherein said hitch-engaging brackets include a plurality of vertical portions when said brackets are operatively associated with said mounting posts, each said bracket extending from one of said mounting posts and terminating along an edge of one of said vertical portions.

10. The mower assembly as defined in claim 9 wherein each said hitch-engaging bracket includes tow 90° angles to define three vertical portions on each of said hitch-engaging brackets, at least two of said vertical portions of said pair of hitch-engaging brackets being positioned on said mower assembly in a parallel relationship.

11. The mower assembly of claim 10 wherein said hitch-engaging brackets are positioned on said suspension mounting posts to provide a substantially constant distance between said at least two vertical portions when said mower assembly is oriented in either said wide orientation or said narrow orientation, said hitch-engaging brackets being adaptable for attachment to a hitch along one of said vertical portions.

* * * * *